United States Patent
Smiley

(10) Patent No.: US 6,301,581 B1
(45) Date of Patent: Oct. 9, 2001

(54) METHOD AND SYSTEM FOR MANAGING ACCESS TO A PLURALITY OF DATA OBJECTS

(75) Inventor: Phillip L. Smiley, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/283,466

(22) Filed: Aug. 1, 1994

(51) Int. Cl.[7] .................................................. G06F 17/30
(52) U.S. Cl. ............................. 707/103; 707/3; 707/102; 707/104
(58) Field of Search ...................... 364/DIG. 1; 395/600; 707/103, 3, 102, 104

(56) References Cited

U.S. PATENT DOCUMENTS

| | | | |
|---|---|---|---|
| 4,791,561 | * 12/1988 | Huber | 364/300 |
| 5,133,068 | * 7/1992 | Crus et al. | 395/600 |
| 5,161,225 | * 11/1992 | Abraham et al. | 395/600 |
| 5,295,256 | * 3/1994 | Bapat | 395/500 |
| 5,317,729 | * 5/1994 | Mukherjee et al. | 395/600 |
| 5,379,419 | * 1/1995 | Heffernan et al. | 395/600 |
| 5,388,196 | * 2/1995 | Pajak et al. | 395/153 |
| 5,432,930 | * 7/1995 | Song | 395/600 |
| 5,493,677 | * 2/1996 | Balogh et al. | 395/600 |
| 5,499,368 | * 3/1996 | Tate et al. | 395/600 |

* cited by examiner

Primary Examiner—Jean R. Homere
(74) Attorney, Agent, or Firm—Robert L. Troike; Frederick J. Telecky, Jr.

(57) ABSTRACT

The system of the present invention having a first module (20) for storing information describing a plurality of data objects (150, 160, and 170), attributes of each of the plurality of data objects, and relationships therebetween; a second module (15) for accepting and processing user queries generating first results data, the first results data including the information describing the plurality of data objects stored in the first module; and a third module (85) responsive to the second module (15) for generating second results data using the first results data, the second results data including the information contained in the plurality of data objects. The method of the present invention having the steps of providing data which describes the plurality of data objects, attributes of the plurality of data objects, and relationships therebetween; providing at least one procedure operable to build a query specific to at least one of the plurality of data object; accepting user requests querying the data; updating a first results file in response to the user requests; generating the query specific to at least one of the plurality of data objects with at least one procedure in response to the first results file; executing the query specific to at least one of the plurality of data objects; and generating a second results files in response to the executing step which includes information contained within at least one of the plurality of data objects.

8 Claims, 4 Drawing Sheets

| | Object Name | OID |
|---|---|---|
| 401 | Object | 1 |
| 402 | Attributes | 2 |
| 403 | Relationships | 3 |
| 404 | 1-1 Relationships | 4 |
| 405 | 1-M Relationships | 5 |
| 406 | M-1 Relationships | 6 |
| 407 | M-M Relationships | 7 |
| 408 | Sales Contact | 8 |
| 409 | Product | 9 |
| 410 | Order | 10 |
| 411 | Order_Line | 11 |

FIG. 4

| | Attribute Name | OID | Sort_Sequence |
|---|---|---|---|
| 501 | Name | 1 | 0 |
| 502 | OID | 2 | 1 |
| 503 | Name | 3 | 0 |
| 504 | OID | 4 | 1 |
| 505 | Sort_Sequence | 5 | 0 |
| 506 | Name | 6 | |
| 507 | Source_OID | 7 | |
| 508 | Dest_OID | 8 | |
| 509 | OID | 9 | 1 |
| 510 | Primary | 10 | |
| 511 | Source_OID | 11 | 1 |
| 512 | Relationship_OID | 12 | 2 |
| 513 | Destination_OID | 13 | 0 |
| 514 | Source_OID | 14 | 0 |
| 515 | Relationship_OID | 15 | 2 |
| 516 | Destination_OID | 16 | 1 |
| 517 | Source_OID | 17 | 1 |
| 518 | Relationship_OID | 18 | 2 |
| 519 | Destination_OID | 19 | 0 |
| 520 | Source_OID | 20 | 1 |
| 521 | Relationship_OID | 21 | 2 |
| 522 | Destination_OID | 22 | 3 |
| 523 | Sales_Contact_Name | 23 | |
| 524 | Sales_Contact_Id | 24 | |
| 525 | Product_Name | 25 | |
| 526 | Product_Type | 26 | |
| 527 | Order_ID | 27 | |
| 528 | Order_Line | 28 | |
| 529 | Order_Id | 29 | |
| 530 | Product_Name | 30 | |
| 531 | Product_Type | 31 | |

FIG. 5

| Source OID (701) | Relationship OID (703) | Destination OID (705) |
|---|---|---|

| | Relationship Path Name | Source_OID | Destination_OID | OID | Primary OID | Secondary OID | Source Cardinality | Destination Cardinality | Source Optionality | Destination Optionality | Source Implemented Table | Destination Implemented Table |
|---|---|---|---|---|---|---|---|---|---|---|---|---|
| 601 | Contains | 1 | 2 | 1 | | 2 | 1 | M | M | O | | |
| 602 | Is_Contained_In | 2 | 1 | 2 | 1 | | M | 1 | O | M | | |
| 603 | Is_Source_For | 1 | 3 | 3 | | 4 | 1 | M | M | O | | |
| 604 | Has_As_Source | 3 | 1 | 4 | 3 | | M | 1 | O | M | | |
| 605 | Is_Destination_For | 1 | 3 | 5 | | 6 | 1 | M | M | O | | |
| 606 | Has_As_Destination | 3 | 1 | 6 | 5 | | M | 1 | O | M | | |
| 607 | Is_Primary_For | 3 | 3 | 7 | | 8 | 1 | 1 | O | O | | |
| 608 | Has_Source_Name | 3 | 2 | 8 | 7 | | 1 | 1 | O | O | | |
| 609 | Has_Source_Name | 3 | 3 | 9 | | 10 | 1 | M | O | O | | |
| 610 | Is_Source_Name_Of | 2 | 3 | 10 | 9 | | M | 1 | O | O | | |
| 611 | Has_Destination_Name | 3 | 2 | 11 | | 12 | 1 | 1 | O | O | | |
| 612 | Is_Destination_Name_Of | 2 | 3 | 12 | 11 | | 1 | 1 | O | O | | |
| 613 | Has | 3 | 2 | 13 | | 14 | 1 | 1 | O | O | | |
| 614 | Defines | 2 | 3 | 14 | 13 | | 1 | 1 | O | O | | |
| 615 | Sells | 8 | 9 | 15 | | 16 | M | M | O | O | | |
| 616 | Sold_By | 9 | 8 | 16 | 15 | | M | M | O | O | | |
| 617 | Orders | 8 | 9 | 17 | | 18 | M | M | O | O | | |
| 618 | Ordered_By | 9 | 8 | 18 | 17 | | M | M | O | O | | |
| 619 | Returns | 8 | 9 | 19 | | 20 | M | M | O | O | | |
| 620 | Returned_By | 9 | 8 | 20 | 19 | | M | M | O | O | | |
| 621 | Is_On | 9 | 10 | 21 | | 22 | 1 | 1 | M | M | | |
| 622 | Has_On_It | 10 | 9 | 22 | 21 | | M | 1 | O | O | | |
| 623 | Contains | 10 | 11 | 23 | | 24 | M | M | M | O | | |
| 624 | Is_Contained_In | 11 | 10 | 24 | 23 | | M | 1 | O | M | | |

METHOD AND SYSTEM FOR MANAGING ACCESS TO A PLURALITY OF DATA OBJECTS

This application is related to co-pending application Ser. No. 07/921,826 filed Jul. 29, 1992.

BACKGROUND OF THE INVENTION

In the information age, one of the most significant challenges facing business is the management of ever increasing amounts of information across increasingly complex and varied environments. As the competitive environment in which the business operates expands across the globe, the speed and ease of access to this information becomes critical. From a storage and processing standpoint, significant advances in computing hardware, including computer memory and computer processors, have kept pace with the increasing amounts of information required in day-to-day business operations. However, these advances in computing hardware are in part responsible for the increasingly complex and varied environments in which the information is found.

One reason that a variety of platforms are used to store and process data is that as business expands and competition increases, control is decentralized so that decisions can be made quickly by each business entity using local information. As a result of the decentralization of the business decision making process, the mainframe processors, previously the only platform on which to handle high volume information processing, are downsized to or integrated with local minicomputers and workstations. Along with the local minicomputers and workstations come a variety of software tools specific to that platform to assist in the processing of information.

Localized processing capability generally means even more information is generated but, the additional information and local changes to existing information may not be available throughout other areas of the business system.

One solution is to simply duplicate all information across all platforms. This solution, however means wasted resources in that if all of the duplicated information is not needed, the space could have been used to store other information. Also, duplication of information across multiple platforms also means that the information must be updated on each platform. Another solution is to provide access, i.e., though a network, to every other platform. The problem with this solution, however, is that each platform must then know how to operate under the systems of every other platform in order to take advantage of the availability of that platform's information. One platform, for example, may be a minicomputer using an Oracle database and another platform may be a mainframe using IBM's Database 2 (DB2).

What is needed is a method and system for managing access to a plurality of data objects located across a variety of platforms which provides quick, easy access to the information contained therein.

SUMMARY OF THE INVENTION

One embodiment of the system of the present invention includes an information access encyclopedia, or information repository, for selecting, updating, creating and deleting information describing and information included in a plurality of data objects across a variety of platforms which insulates users from the technical complexity of the platform on which the data resides. This embodiment of the information access encyclopedia of the present invention comprises first means for storing the information describing the plurality of data objects; second means for iteratively accepting and processing user queries based on previous queries of the information describing the plurality of data objects stored in the first means generating first results data; and third means responsive to the second means for generating second results data using the first results data. The second results data includes the information contained in the plurality of data objects.

One embodiment of the method of the present invention includes the steps of providing data which describes the plurality of data objects, attributes of the plurality of data objects, and relationships therebetween; providing at least one procedure operable to generate a query specific to at least one of the plurality of data object; iteratively accepting user queries based on the results of previous queries on the data; updating a first results file in response to the user queries; generating the query specific to at least one of the plurality of data objects with at least one procedure in response to the first results file; executing the query specific to at least one of the plurality of data objects; and generating a second results files in response to the executing step which includes information contained within at least one of the plurality of data objects.

BRIEF DESCRIPTION OF THE DRAWINGS

For a better understanding of the present invention, reference may be made to the accompanying drawings, in which.

DETAILED DESCRIPTION OF THE INVENTION

The system and method of the present invention provides an information access encyclopedia (IAE), or information repository, for managing access to a plurality of data objects located across a variety of platforms while insulating users from the technical complexities of the platforms on which the data objects reside, i.e., providing a seamless interface. The system and method of the present invention is implemented, for example, using an object oriented database management system (OODBMS) or a relational database management system (RDBMS) on a general purpose digital computer which is connected, for example, through a network to the various platforms on which the data resides and at which access to that data is needed. In particular, the system and method of the present invention implemented using an OODBMS takes advantage of inheritance, multiple inheritance, relationship definition (complex objects) and object identifier (OID) generation features provided by the OODBMS. Each of these features can also be implemented using the RDBMS approach but, with an increase in system size and complexity.

Figure 1:
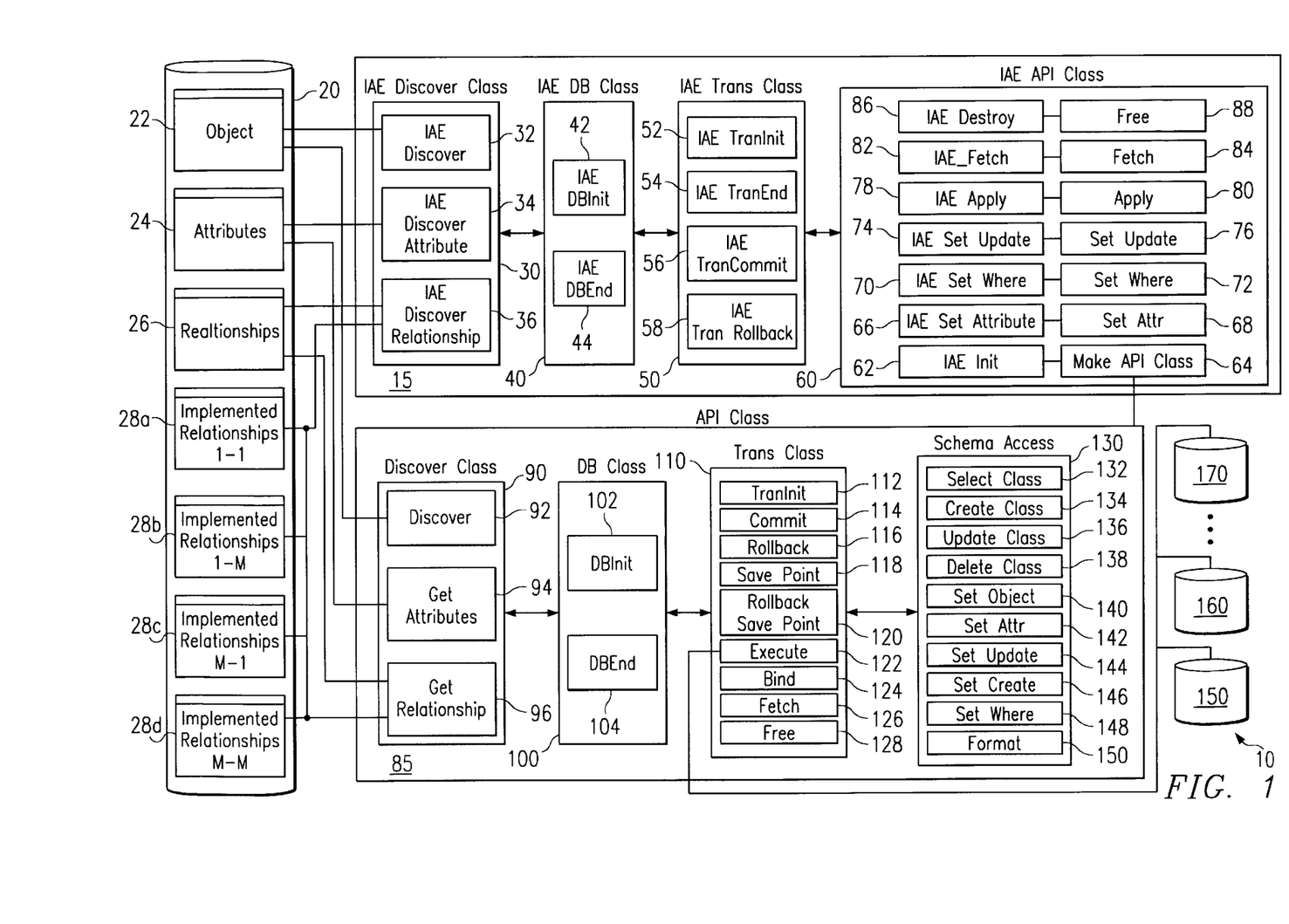
FIG. 1 is a block diagram of one embodiment of the system of the present invention.

One embodiment of the present invention is illustrated generally in FIG. 1. FIG. 1 shows an IAE 10 which includes an application programming interface (API) 15, an IAE database 20 and a data object interface 80. IAE 10 provides access to the data stored in exemplary data objects 150, 160 and 170. Exemplary data objects 150, 160 and 170 can represent program files, text files, databases, etc. or any combination of program files, text files, databases, etc., depending upon the particular application.

Not only do exemplary data objects 150, 160 and 170 represent different forms of data, but they also represent different forms of data on different platforms. For example, exemplary data object 150 can represent a database implemented using IBM's DB2 on a mainframe while exemplary data object 160 represents a file directory structure on a microcomputer and exemplary data object 160 is an accounting system on a minicomputer.

Under the system and method of the present invention, components of each of the exemplary data objects are described in IAE database 20. This descriptive information is browsed or navigated using API 15. API 15 provides easy access to the data through a series of generalized query commands which are independent of the type of data and of the platform on which the data is stored. In processing these query commands, API 15 uses of its knowledge of the structure of IAE database 20 and of how data in IAE database 20 is modeled to browse or navigate IAE database 20. Results of the browsing or navigating are then used by APIClass 85 to provide access to the data stored in or represented by exemplary data objects 150, 160 and 170 by building queries specific to exemplary data objects 150, 160 and 170. APIClass 85 also generates specialized execution requests specific to the platform on which exemplary data objects 150, 160 and 170 reside to process those specific queries. The access methods used by APIClass 85 are transparent to the user. The routines needed to perform both the specialized query generation and the specific platform execution command generation functions are provided by the user responsible for setting up IAE 10 whenever a data object is added to IAE 10. Thus, to access the data in any of the exemplary data objects 150, 160 and 170, the user need only execute the generalized query commands provided by API 15.

Through API 15, applications using the IAE 10 can accomplish two tasks. First, the generic nature of API 15 and of the IAE database 20 allows immediate visibility of changes to exemplary data objects 150, 160 and 170 and of additions of other data objects to those applications using IAE 10. Furthermore, the generic query and update provided by API 15 and processed by APIClass 85 eliminate the need for duplicating methods for accessing each exemplary data object 150, 160 and 170 for each application interfacing with exemplary data objects 150, 160 and 170. Without API 15 and APIClass 85, these methods are provided by each of the applications requesting access to the information included in exemplary data objects 150, 160 and 170.

In order to include an exemplary data object 150, 160 or 170 in the IAE 10 of the present invention, data representing and/or describing exemplary data object 150, 160 or 170 must be entered in IAE database 20. Data entered in IAE database 20 is modeled as shown in the entity relationship diagram (ERD) at 200 in FIG. 2. The ERD 200 includes three object types: data object type 205, relationship object type 210 and attribute object type 220. Each of these object types are implemented as tables in one embodiment of the system of the present invention as shown in FIG. 1.

Data object type 205 is implemented as data object table 22 shown in FIG. 1. The data object table 22 includes the fields, shown in FIG. 4, Name 412 and OID 413. Name 412 is a character field which identifies the object described in IAE 10. OID 413 is a numerical field which identifies each instance of data object table 22.

Figure 5:
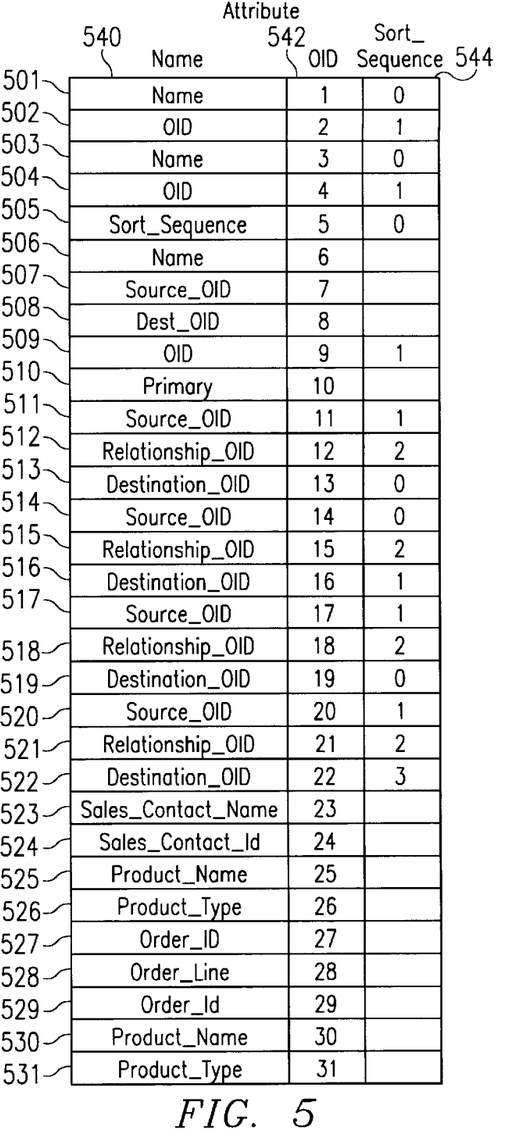
FIG. 5 illustrates an attribute object table which includes information describing attributes of the objects included in the data object table of one embodiment of the system and method of the present invention.

Attribute object type 220 is implemented as the attribute object table 24 in FIG. 1. Attribute object table 24 includes the fields, as shown in FIG. 5, name 540, OID 542 and sort sequence 544. Each record in attribute object table 24 describes an attribute of an object described in data object table 22.

Figure 2:
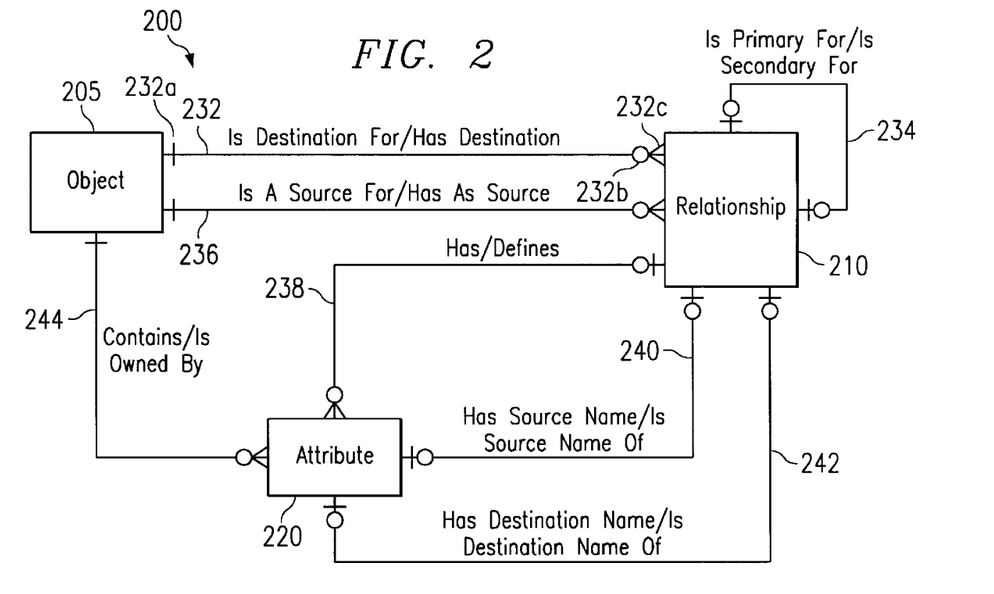
FIG. 2 shows an entity relationship diagram illustrating how data stored in one embodiment of the system and method of the present invention is modeled.
Figure 6:
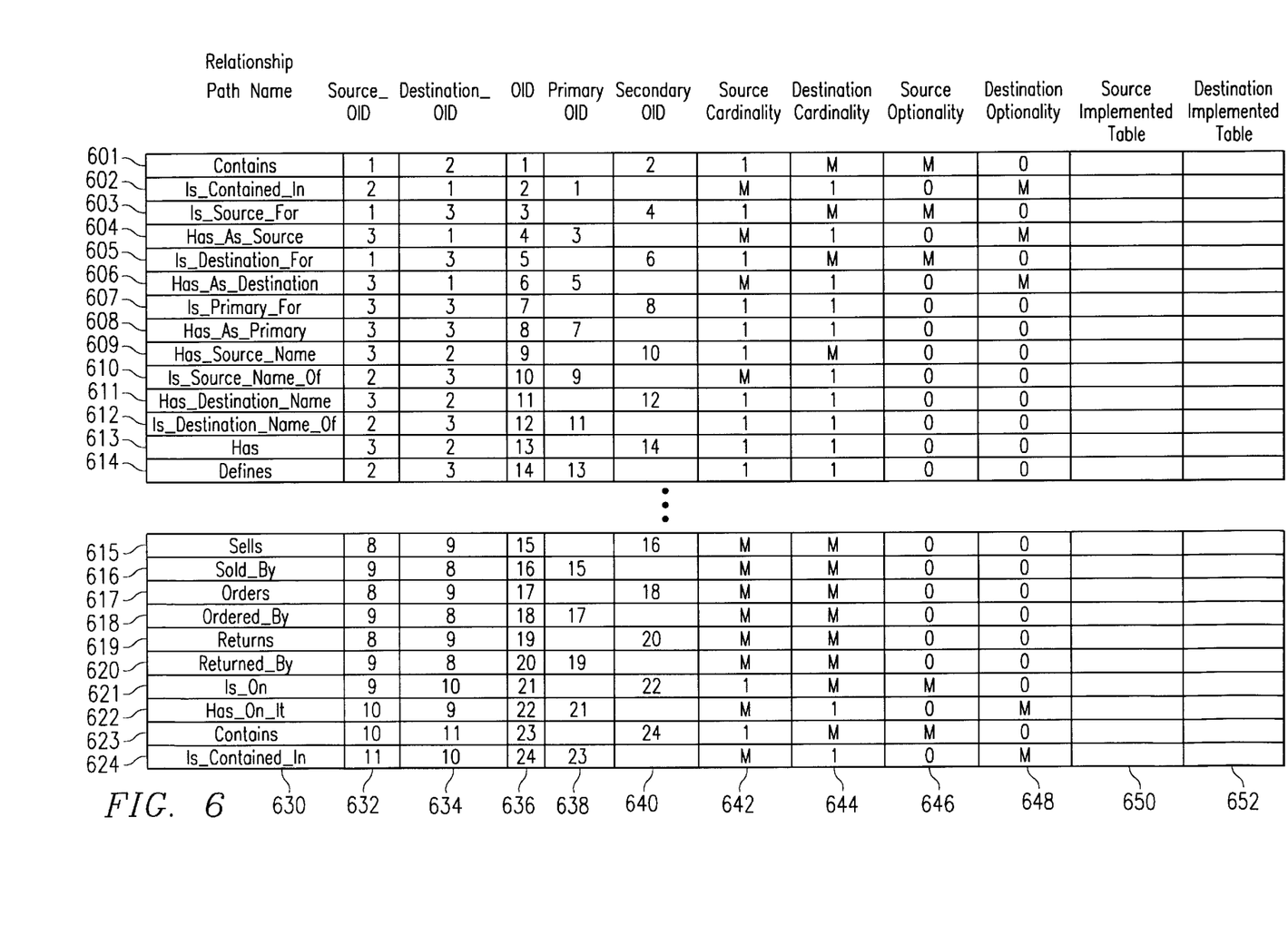
FIG. 6 illustrates a relationship object table which includes information describing relationships between objects, attributes and relationships in one embodiment of the system and method of the present invention.

Relationship object type 210 is implemented as the relationship object table 26 shown in FIG. 1. Relationship object table 26 includes the fields, as shown in FIG. 6, relationship path name 630, source OID 632, destination OID 634, OID 636, primary OID 638, secondary OID 640, source cardinality 642, destination cardinality 644, source optionality 646, destination optionality 648, source implemented table 650 and destination implemented table 652. Records in relationship object table 26 describe logical connections between the object records stored in data object table 22, the attribute records stored in attribute object table 24 and the relationship records stored in relationship object table 26. The logical connections are shown in FIG. 2 at 232, 234, 236, 238, 240, 242 and 244.

Each logical connection is represented by two records or instances in relationship object table 26 so that a connection may be traversed in either direction by API 15. Each record or instance is referred to as a relationship path and represents one logical relationship between the two object types it connects. Each relationship path is referred to by its relationship path name 630 and connects the object represented by the field source OID 632 to the object represented by the field destination OID 634 in the relationship object table 26. One of the relationship paths is designated as primary and the other relationship path is designated as secondary. If a record in relationship object table 26 represents a primary relationship path, then the field secondary OID 640 specifies which record in relationship object table 26 represents the corresponding secondary relationship path. If the relationship in relationship object table represents a secondary relationship path, then the field primary OID 638 specifies which record in relationship object table 26 represents the corresponding primary relationship path.

The ERD 200 further models the cardinality and the optionality of the relationships between data object type 205, relationship object type 210 and attribute object type 220.

The cardinality of a relationship between objects, relationships and attributes provides an indication of how many of each are members in the relationship. The cardinality of a relationship is either one-to-one (1-1), one-to-many (1-M), many-to-one (M-1) or many-to-many (M-M). Depending upon the application, data for any of the one-to-one, one-to-many, many-to-one or many-to-many relationships may be included in an external data source or in the corresponding IAE 10 implemented relationship table 28a, 28b, 28c or 28d. The field source implemented table 648 in FIG. 6 specifies where the source object data for the particular relationship is located. The field destination implemented table 650 specifies where the destination object data for the particular relationship is located.

If the actual data is stored in the IAE 10, then, depending upon the cardinality of the relationship, the relationship data is stored in one version of the implemented relationship tables 28a, 28b, 28c or 28d. One-to-one relationship data is implemented in the 1-1 implemented relationship table 28a shown in FIG. 1, one-to-many relationship data is implemented in the 1-M implemented relationship table 28b shown in FIG. 1, many-to-one relationship data is implemented in the M-1 implemented relationship table 28c shown in FIG. 1 and many-to-many relationship data is implemented in the M-M implemented relationship table 28d.

The cardinality of a relationship is illustrated, for example, at 232a and at 232b in FIG. 2. The single bar at 232a indicates that one data object type 205 is related to many, as shown by the three bars at 232c, relationship object types 210. Thus, the relationship illustrated at 232 between data object type 205 and relationship object type 210 is a one-to-many (1-M) relationship. Relationships in an ERD, however, may be traversed in either direction. In other words, the relationship illustrated at 232 from data object type 205 to relationship object type 210 is distinct from the relationship illustrated at 232 from relationship object type 210 to data object type 205. The second relationship, from relationship object type 210 to data object type 205, has its own cardinality. The relationship illustrated at 232 between relationship object type 210 and data object type 205 is a many-to-one (M-1) relationship.

The optionality of a relationship between object types, relationship types and attribute types specifies whether or not that particular relationship must be defined at creation of the object. If a relationship is optional for an object then no data describing that relationship need be entered in IAE database 20 when an object instance is created. If a relationship is mandatory, then that relationship must be instantiated when the object is instantiated. As with cardinality, optionality of a relationship is directional. For example the relationship at 232 from data object type 205 to relationship object type 210 is mandatory. Therefore, each relationship instance must specify a source object type 205 and a destination object type 205. However, the relationship at 232 from relationship object type 210 to data object type 205 is optional, as shown the circle at 232b.

Figure 3:
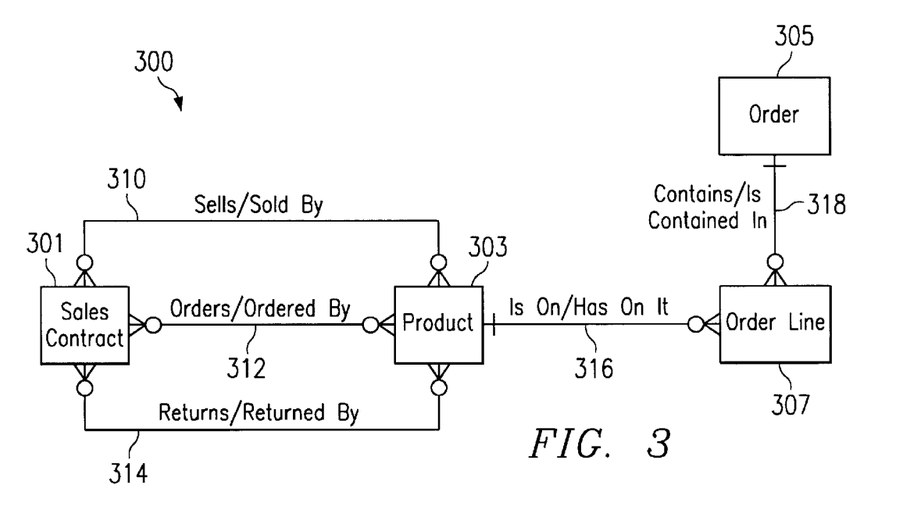
FIG. 3 is an entity relationship diagram illustrating how data in an exemplary system is modeled so that it can be stored in one embodiment of the system and method of the present invention.

As an example, FIG. 3 illustrates, at 300, an exemplary order entry database system which is modeled for access through the system and method of the present invention. The exemplary order entry database system 300 in FIG. 3 includes the data objects sales contact 301, product 303, order 305 and order line 307. Sales Contact 301 is a table which includes information describing the customer base of an entity which uses exemplary order entry database system 300. Sales Contact 301 includes the fields Sales_Contact_Name and Sales_Contact_ID. Product 303 is a table which includes information describing products available for ordering through exemplary order entry database system 300. Product 303 includes the fields Product_Name and Product_Type. Order 305 is a table which includes information describing orders that have been made through the exemplary order entry database system 300. Order 305 includes the field Order_ID. Order Line 307 is a table which includes information describing each entry line of an order described in Order 305. Order Line 307 includes the fields Order_ID, Product_Name and Product_$_{Type}$.

Figure 4:
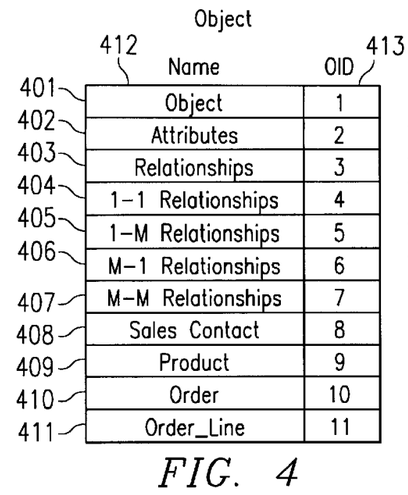
FIG. 4 illustrates a data object table which includes information describing objects accessible through one embodiment of the system and method of the present invention.

In order to provide access to the exemplary order entry database system 300 through the IAE 10, the user initializes the system by first entering a record in object table 22 for each of the tables (sales contact 301, product 303, order 305 and order line 307) of the exemplary order entry database system 300 as shown at lines 408 through 411 in FIG. 4. Next, each attribute or fields of each of the tables in exemplary order entry database system 300 is described in a record in attribute table 24 as shown at lines 523 through 531 in FIG. 5.

FIG. 3 also illustrates the logical connections which relate the objects or tables which make up exemplary order entry database system 300. Each connection is implemented as two relationship paths each represented by a relationship path name. As shown in FIG. 3, sales contact 301 is related to product 303 by the many-to-many relationship path shown at 310 with relationship path name "sells." The relationship path at 310 also shows that product 303 is related to sales contact 301 by a many-to-many optional relationship with relationship name "sold by." These relationship paths between data objects are descriptive of the functional connection between objects. As the relationship at 301 in FIG. 3 illustrates, a contact in sales contact 301 sells products in product 303 and the products in product 303 are sold by the contacts in sales contact 301.

Thus, the next step in providing access to exemplary order entry database system 300 through IAE 10 is to describe each of the relationship paths between the objects which comprise exemplary order entry database system 300 as a record in the relationship object table 26. The records describing the relationships shown in FIG. 3 are illustrated in FIG. 6 at lines 615 through 624. The relationships shown in FIG. 3 could also be implemented outside the IAE 10 in an intersection table Sales Contact/Product, not shown, which includes the fields Sales_Contact_Name, Sales_Contact_ID, Product_Name and Product_Type. Thus, the user could navigate between the objects Sales_Contact 301 and Product 303 by looking up either the Sales_Contact_ID or the Product_Name in the intersection table.

Another method of describing relationships between objects is illustrated in FIG. 3 at 318 in the one-to-many relationship from order 305 to order line 307 and at 316 in the one-to-many relationship from product 303 to order line 307. Since the relationships shown at 316 and at 318 are one-to-many relationships, the fields Order_ID and Product_Name can be included in each instance of order line 307 instead of in one of the implemented relationship table 28a, 28b, 28c or 28d and instead of in an intersection table.

Finally, data implementing the relationships described in relationship object table 26 is entered into IAE 10. The data source is designated by the field source implemented table 650 and the destination data source is designated by the field destination implemented table 652. If the implemented relationship data is stored externally, then implementing field names and field types are also required. If the implemented relationship data is stored internally in IAE 10, then the data is entered either in the one-to-one implemented relationships table 28*a*, the one-to-many implemented relationships table 28*b*, the many-to-one implemented relationships table 28*c* or the many-to-many implemented relationships table 28*d*, based upon the cardinality of the relationship. Whether the implemented relationship data is stored external or internal and what that implemented relationship data is depends upon the application.

In one embodiment of the system and method of the present invention, meta data (data other than raw data, i.e., data describing the IAE 10 itself) is also stored in IAE 10. API 15 uses this meta data to navigate IAE database 20 while processing the generalized queries from the user. A first results file, including data from IAE database 20, is generated and is then used to build specialized query statements accessing the data stored in exemplary data objects 150, 160 and 170. The meta data stored in and describing IAE 10 includes instances of data object table 22 which describe data objects of IAE 10 (i.e., lines 401 through 407 in FIG. 4), instances of attribute object table 24 which further describe instances of data object table 22 (i.e., lines 501 through 522 in FIG. 5) and instances of relationship object table 26 which describe the logical connections or relationships which associate instances of data object table 22, instances of attribute object table 24 and instances of relationship object table 26 (i.e., lines 601 through 614 in FIG. 6). This recursive nature of the IAE 10 further supports navigation by API 15 through other data objects stored in the IAE 10.

While the relationships are classified as either optional or mandatory, to fully implement the IAE 10 as a self-describing database each relationship must be known to the IAE 10 schema access software. Furthermore, because these relationships define the structure of IAE 10 meta data, they should not be exposed to an application by any IAE 10 discovery or navigation function. Also, this embodiment of the system and method of the present invention relies on these relationships being implemented as named.

The embodiment of the system of the present invention, illustrated in FIG. 1, includes the IAE 10 meta-data stored in IAE Database 20. IAE Database 20 includes object data table 22, attribute data table 24, relationship data table 26, 1-1 implemented relationships data table 28*a*, 1-M implemented relationships data table 28*b*, M-1 implemented relationships data table 28*c* and M-M implemented relationships data table 28*d*.

Figure 7:
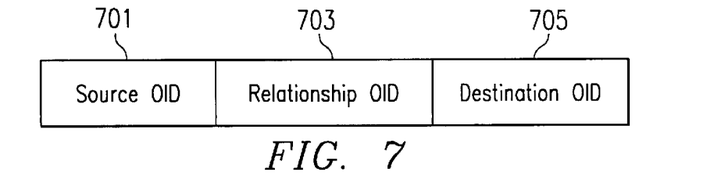
FIG. 7 illustrates the fields included in each of four implemented relationship tables (one for one-to-one relationships, one for one-to-many relationships, one for many-to-one relationships and one for many-to-many relationships) which include data describing implemented relationships in one embodiment of the system and method of the present invention.

For each implementation of the relationships described in relationship data table 26, one record is included in either the 1-1 implemented relationships data table 28*a*, the 1-M implemented relationships data table 28*b*, the M-1 implemented relationships data table 28*c* or the M-M implemented relationships data table 28*d*, depending upon the cardinality of the relationship. The fields included in the 1-1 implemented relationships data table 28*a*, the 1-M implemented relationships data table 28*b*, the M-1 implemented relationships data table 28*c* and the M-M implemented relationships data table 28*d* are, as shown in FIG. 7, a source OID 701, a relationship OID 703 and a destination OID 705. Each of the relationships data tables 28*a*, 28*b*, 28*c* and 28*d* controls the cardinality of their members using indexes on the three fields included in each of the implemented relationships data tables 28*a*, 28*b*, 28*c* and 28*d*.

To enforce 1-1 cardinality on relationships, represented by the relationship OID 703, between the source object and the destination object, represented by the source OID 703 and the destination OID 705, respectively, 1-1 implemented relationships data table 28*a* includes two indexes. One index is on the source OID 701 and the relationship OID 703. The other index is on the destination OID 705 and the relationship OID 703.

To enforce 1-M cardinality on relationships, represented by the relationship OID 703, between the source object and the destination object, represented by the source OID 701 and the destination OID 705, respectively, 1-M implemented relationships data table 28*b* includes an index on the destination OID 705 and the relationship OID 703.

To enforce M-1 cardinality on relationships, represented by the relationship OID 703, between the source object and the destination object, represented by the source OID 701 and the destination OID 705, respectively, M-1 implemented relationships data table 28*c* includes an index on source OID 701 and relationship OID 703.

To enforce M-M cardinality on relationships, represented by the relationship OID 703, between the source object and the destination object, represented by the source OID 701 and the destination OID 705, respectively, M-M implemented relationships data table 28*d* includes an index on the source OID 701, the relationship OID 703 and the destination OID 705.

In implemented relationships data tables 28*a*, 28*b*, 28*c* and 28*d*, only the primary relationship path is implemented. To search the secondary relationship path, the record corresponding to the primary relationship path in the implemented relationships data tables 28*a*, 28*b*, 28*c* and 28*d* is read in reverse. For example, the destination OID 705 is read for the source OID 701 and the source OID 701 is read for the destination OID 705. Whether a relationship path is primary or secondary is indicated by the fields primary OID 636 and secondary OID 638.

Once the data to be accessed is modeled in IAE 10, API 15 controls the access to the data by accepting and processing user requests for the data. Before any processing is done by IAE 10, IAE DBInit 42 establishes a connection with the IAE database 20. The specific database and server location is which contain IAE database 20 obtained from a userid profile.

Once a connection is established with IAE database 20, IAE TranInit 52 establishes a transaction session under the specified database connection to IAE Database 20. All database activity must be done under the scope of the specified transaction.

At this point, the user navigates through IAE database 20 to determine the objects, attributes of those objects, and relationships between those objects and attributes which are available for use in generating queries on the data in the IAE database 20. The functions for navigating IAE database 20 include IAE Discover 32, IAE DiscoverAttribute 34 and IAE Discover Relationship 36.

Generally, navigation starts with IAE Discover 32 which returns information about the objects included in object data table 22. The information returned includes a non-persistent object handle which used in subsequent discover and navigation queries. As noted earlier, meta data describing the IAE 10 is not accessible through navigation commands. Once the objects stored in IAE 10 are known, the user can then select a particular object(s) and then navigate either the attributes, stored in attributes data table 24, associated with that object(s) or the relationships, stored in relationship data table 26, associated with the selected object(s).

To navigate the attributes associated with the selected object(s), the function IAE DiscoverAttribute 34 returns all attributes and descriptive attribute data for the specified object handle.

To navigate the relationships associated with a selected object, the function IAE DiscoverRelationship 36 returns all relationships and descriptive relationship data for the specified object. A relationship through which to continue navigation may then be chosen from the returned relationships and the user is then given another object handle. By iteratively continuing in this manner, all data accessible through the IAE 10 may be navigated.

Various SQL commands or requests are also available to the user during the navigation of the data accessed through the IAE 10. These requests include select, create, update and delete. In an OODBMS implementation of the present invention, as discussed below, the processing of each of these requests involves specialized class structures which take advantage of the inheritance, multiple inheritance, relationship definitions (complex objects) and OID generation features found in an OODBMS.

Within the transaction initiated using IAE TranInit 52, a data object on which to process query commands is selected and Init 62 establishes an IAE session under which these processes are performed. Within this session, all information necessary to access the IAE Database 20 for the specified data object is collected. In this implementation of the present invention, Make APIClass 64 is called by IAE Init 62 and creates an instance of APIClass 85 and sets the object name and desired function (select, create, update or delete). Before the desired function requested by the query is actually executed, other functions within IAE APIClass 60 are executed to set up the environment. These pre-processing functions include IAE SetAttribute 66, IAE SetWhere 70, and IAE Set Update 74.

IAE SetAttribute 66 is used to iteratively specify the attributes to be selected by a select request. Each call specifies an attribute (referenced by its handle), an optional sort sequence and a sort order. SetAttribute 68 is called by IAE SetAttribute 66 and maintains an array of the requested attributes and data value addresses in the user's address space.

IAE SetWhere 70 iteratively specifies the selection or "where" criteria to be used by all select, update and delete requests. This function specifies attributes (by handle), their comparative values and relational operators as well as conjunctive operators such as "AND" and "OR." IAE SetWhere 70 is also used to select instances of a specified object by relationship. In this case, the parameter Operator has a value of "OP_ASSOCIATE," the parameter WhereHandle is a relationship handle instead of an attribute handle, and the parameter Value is the OID (object identifier) to be used in the selection criteria. SetWhere 72 is called by IAE SetWhere 70 and collects attribute-operator-value triples used in IAE selection criteria. Valid operators used by IAE SetWhere 70 include "=", "<=", ">=", "<>", "<", ">", "ASSOCIATE" and "DISASSOCIATE."

IAE SetUpdate 74 iteratively specifies the values to be used by an update or create request. IAE SetUpdate 74 specifies attributes (by handle) and their value. IAE SetUpdate 74 is also used to create or delete relationships between object instances. In this case, the parameter Operator has a value of "OP_ASSOCIATE" or "OP_DISASSOCIATE", the parameter UpdateHandle is a relationship handle rather than an attribute handle and the parameter Value is the OID (object identifier) to be associated with (or disassociated from) the specified object instances. SetUpdate 76 is called by IAE SetUpdate 74 and collects relationship OID-OID pairs used when associating or disassociating one object instance with or from another object instance.

IAE Apply 78 then generates a database query using the information supplied by the functions IAE SetAttribute 66, IAE SetWhere 70 and IAE SetUpdate 74. The query is in the form of a standard query language (SQL) statement, represented by a statement handle which is used by other functions that need to access the generated statement. For create requests only, IAE Apply 78 returns the OID (object identifier) of the generated object instance. Apply 80 is called by IAE Apply 78 in generating the SQL request to access the needed data included in exemplary data objects 150, 160 and 170.

Just as IAE DBInit 42 establishes a connection to IAE database 20, DBInit 102 establishes a connection between the IAE 10 and each of the underlying DBMS's represented by exemplary data objects 150, 160 and 170. DBInit 102 also returns necessary semantics for communicating with the selected underlying DBMS including a DBMS handle used by TranInit 112 of TransClass 110.

Thus, for processing queries on exemplary data objects 150, 160 and 170 generated by IAE Apply 78, TranInit 112 establishes a transaction class instance which defines a transaction associated with the current database connection established by DBInit 102.

In order to process the requests generated by API 15, APIClass 85 uses the data supplied through the previous navigation or discovery of the objects, attributes and relationships in IAE database 20. With these results, navigation or discovery of data in exemplary data objects 150, 160 or 170 is performed. Any data stored in IAE database 20 which is needed to access the data stored in exemplary data objects 150, 160 or 170 is retrieved through functions which include Discover 92, GetAttributes 94 and GetRelationship 96. The operation of these functions is similar to the operation of IAE Discover 32, IAE DiscoverAttribute 34 and IAE DiscoverRelationship 36.

The function SelectClass 132 processes a select request by the user. In an OODBMS implementation of the present invention, the processing done by SelectClass 132 includes creating a new instance of a class Select, not shown, allocating a new instance of a class called CommaThings which will include a list of attributes to be selected and corresponding sort criteria and allocating a new instance of a class called Table, not shown, which will include a list of "where" criteria to be used by the select request.

The function CreateClass 134 processes a create request by the user. The processing done by CreateClass 134 includes creating a new instance of a class called Create, and allocating a new instance of the class CommaThings which will include list of the attributes to be created.

The function UpdateClass 136 processes an update request by the user. The processing done by UpdateClass 136 includes creating a new instance of a class Update, allocating a new instance of the class CommaThings which will include a list of attributes and associated values to be changed, and allocating a new instance of a class Table which will include a list of "where" criteria used by the update request.

The function DeleteClass 138 processes a delete request by the user. The processing done by DeleteClass 138 includes creating a new instance of a class Delete, and allocating a new instance of the class Table which will include a list of "where" criteria used by the delete request.

APIClass 85 includes, as included in API 15, the process of setting up the environment in which the second query is executed through a collection of functions. These functions include SetObject 140, SetAttribute 142, SetUpdate 144, Set Create 146 and SetWhere 148. SetObject 140 set the name of the data object instance to be acted upon. SetAttribute 142 specifies one attribute and associated sort criteria used by an instance of the class Select. SetUpdate 144 specifies one attribute-value-data type triple used by the class Create or Update. SetCreate 146 specifies the name of the IAE 10 data object to create. SetWhere 148 specifies one operator-attribute-value triple used by the class Select, Delete or Update.

Format 150 specifies how the information from the functions SetObject 140, SetAttribute 142, SetUpdate 144, SetCreate 146 and SetWhere 148 is expanded into a database query statement specific to at least one of the data objects. Using this information, Format 150 formats the query statement and then stores the generated query statement in a query buffer. The format of the query statement generated by Format 150 varies from the simple case to the complex case depending upon the query command received from API 15 and upon the underlying DBMS which processes the query statement. The procedure or procedures executed to generate the specific query are provided by the user responsible for setting up IAE 10. Generation and execution of the query specific to the exemplary data object 150, 160 or 170 are transparent to the user.

The user continues processing queries within the specified transaction and makes no changes to the underlying DBMS until a Commit command is executed. Commit 114 processes the commit command by applying to the underlying DBMS all update requests made under the current transaction. The current transaction is then cleared and remains active for further activity. Rollback 116, on the other hand, discards all update requests made but not yet applied through Commit 114 under the current transaction. The transaction remains active for further activity.

SavePoint 118 defines a marker or starting point inside the specified transaction class instance from which updates and changes are stored. The data is stored temporarily in memory under a currently active transaction until a Commit 114 command is executed. With the Commit 114, the data is stored to the corresponding permanent file. Save points are used to maintain IAE data consistency during complex updates such as relationship instantiation or during instance deletes.

RollbackSavePoint 120 discards all updates made under the current SavePoint. Such updates may only be committed via the transaction scoped Commit 114. After RollbackSavePoint 120 finishes processing, the transaction remains active for further activity.

Execute 122 passes the generated query statement (created by Format 150 of Schema Access 130) to the underlying DBMS and returns a handle to the results file generated by the executed query statement.

Bind 124, for select queries, associates a requested attribute with a specified address in the user's address space.

Fetch 126, for select queries, is used to fetch result data from the underlying DBMS query results. Fetch 126 places the retrieved data into the user's address space.

Free 128 releases all resources associated with the specified Statement generated by Format 150.

DBEnd 104 terminates the connection to the underlying DBMS made by DBInit 102.

IAE Fetch 82 iteratively polls data from the IAE result data table generated after a select request. For each returned instance, the parameter OID specifies the OID of the associated instance. Fetch 84 is called by IAE Fetch 82 and fetches the results of a select request.

IAE TranCommit 56 commits (updates the IAE Database 20 for) all IAE database 20 updates done within the scope of the specified transaction. After a commit, the current transaction is available for further work.

IAE TranRollback 58 rolls back (does not update the IAE Database 20 for) all IAE database 20 updates done under the scope of the specified transaction. After a rollback, the current transaction is available for further work.

IAE TranEnd 54 terminates the specified IAE transaction. If any updates are outstanding, they are NOT committed.

IAE Destroy 86 deletes all resources associated with building an IAE Database 20 request. Free 88 is called by IAE Destroy 86 and releases resources associated with the specific database.

IAE DBEnd 44 disconnects the user from the IAE Database 20.

Although the present invention has been described in detail, it should be understood that various changes, substitutions and alterations can be made thereto without departing from the spirit and scope of the present invention as defined by the appended claims.

What is claimed is:

1. System for managing access to a plurality of data objects, comprising:

first means for storing information describing said plurality of data objects and for storing information describing attributes of said plurality of data objects and for storing information describing relationships therebetween as a separate relationship object;

second means for accepting and processing user queries on said information stored in said first means and for generating first results data in response to said user queries;

third means responsive to said second means for generating second results data using said first results data, said second results data including information contained in said plurality of data objects.

2. System for managing access to a plurality of data objects, comprising:

first means for storing information describing said plurality of data objects and for storing information describing attributes of said plurality of data objects and for storing information describing relationships therebetween as a separate relationship object;

second means for accepting and processing user queries on said information stored in said first means and for generating first results data in response to said user queries;

third means responsive to said second means for generating a query specific to at least one of said plurality of data objects in response to said first results data, for executing said second query and for generating second results data in response to said execution, said results data including information contained in said plurality of data objects.

3. System for managing access to a plurality of data objects, comprising:

first means for storing information describing said plurality of data objects, for storing information describing attributes of said plurality of data objects as an attribute object, for storing information describing relationships between one of said plurality of data objects and a first attribute of said attributes of said one of said plurality of data objects as instances of said attribute object, for storing information describing relationships between said one of said plurality of data objects and another of said plurality of data objects as an instance of relationship object;

second means for accepting and processing a first query on said information stored in said first means and for generating first results data using said information stored in said first means in response to said first query;

third means responsive to said second means for generating a second query specific to at least one of said plurality of data objects in response to said first results data, for executing said second query and for generating second results data in response to said execution, said results data including information contained in said plurality of data objects.

4. The system of claim 1 wherein said first means includes fourth means for storing said information describing said plurality of data objects, fifth means for storing said information describing said attributes of said plurality of data objects, sixth means for storing information describing said relationships therebetween, and seventh means for storing information describing implemented relationships therebetween.

5. The system of claim 3 wherein said second means includes eighth means for browsing said first means; ninth means for establishing a connection to said first means; tenth means for accepting and processing said first query; and eleventh means for generating said first results data using said information stored in said first means in response to said first query.

6. The system of claim 3 wherein said third means includes twelfth means for browsing said first means; thirteenth means for establishing a connection to said plurality of data objects; fourteenth means for processing said first results data and for generating said second query specific to at least one of said plurality of data objects in response to said first results data; and fifteenth means for controlling and executing said second query and for generating second results data in response to said execution.

7. The system of claim 3 wherein said plurality of data objects described in said first means includes said first means.

8. A method for managing access to a plurality of data objects, comprising the steps of:

providing separate objects which describe said plurality of data objects, attributes of said plurality of data objects, and relationships therebetween;

providing at least one procedure operable to generate a first query specific to at least one of said plurality of data object;

accepting a second query querying said data;

updating a first results file in response to said second query;

executing said at least one procedure to generate said first query specific to said at least one of said plurality of data objects in response to said first results file;

executing said first query specific to said at least one of said plurality of data objects; and generating a second results files in response to said executing step which includes information contained within said at least one of said plurality of data objects.

* * * * *